United States Patent Office 3,351,504
Patented Nov. 7, 1967

3,351,504
METHOD OF BONDING COATINGS
Harold George De Hart, Clifton, N.J., assignor, by mesne assignments, to International Protected Metals, Inc., a corporation of New Jersey
No Drawing. Filed Oct. 9, 1963, Ser. No. 314,865
3 Claims. (Cl. 148—6.14)

The present invention deals with a method of bonding coatings and more particularly with a method of bonding coating materials to metal surfaces.

Thermoplastic and thermosetting resin coatings contemplated in accordance with this invention are provided on metal surfaces, e.g., by fusing such coating materials onto the metal surfaces in various manners. The coating material may be applied to a metal surface as a sheet material and the sheet material being bonded to the metal surface by heat treatment. The coating material may be applied to a metal surface as an aqueous or solvent dispersion of particles and transformed thereon by fusion into a coherent fused layer after evaporation of the liquid vehicle, or the coating may be applied by dipping a heated metal into a loosely settled bed of thermoplastic powder, or by contacting the heated metal with a bed of powder in a state of aeration intermediate that of a fluidized bed and the loosely settled powder, or by spraying the heated metal with thermoplastic powder.

Certain thermoplastic materials herein contemplated, such, e.g., as chlorinated polyethers and fluorocarbon resins, especially polytrifluorochloroethylene, are either reluctant to bond satisfactorily with certain metals, or they readily lose their bond when employed under certain conditions, e.g., as the result of the action of water. The method of the present invention permits such coatings to be very strongly bonded to metals and permits these materials to resist any loss of bond strength even under the action of boiling water for prolonged periods.

The use of other coating materials such as glasses, paints, lacquers, rubber, asphalts, enamels, porcelain and even metals are also herein contemplated and are advantageously bonded to base members in accordance with the method of this invention.

It is an object of the invention to provide a method of bonding protective coating to metals which will result in a strong bond of the coating to the metal base.

It is another object of the invention to provide a method of bonding thermoplastic materials to metals by treating the metal surface with a strong bond producing layer and subsequently fusing a coating of thermoplastic material to the treated surface.

Other objects and advantages of the invention will become apparent from the description hereinafter following:

The method of the invention concerns the pretreating of a metal base to be coated, e.g. a metal base composed of aluminum, iron, steel, or other metals and alloys, to clean a surface of the material. The cleaning can be accomplished by conventional methods such as blasting, pickling, etc., to remove surface films, oil, grease, scale, etc. After cleaning, the metal base is treated with an aqueous solution of $CrO_3$ containing from about 0.1 gm. to 5.5 gm. of $CrO_3$ dissolved in 100 cc. of water. While even less than 0.1% $CrO_3$ may be used, about 0.5% $CrO_3$ produces excelent results. The $CrO_3$ solution is applied by immersing the cleaned surface of the metal in the solution, and an excess of the solution is removed from the metal by light wiping, shaking, etc., so that an even film of the solution remains on the surface. For best results, it is advantageous that the film is an even film, and to assure such a film, a wetting agent may be added to the solution, for example, a wetting agent such as sold by the American Cyanamid Co. under the name Aerosol.

Having applied the film, the metal is heated to a temperature above the melting point of the plastic powder which is to be subsequently applied. For example, the metal is heated to a temperature of about 450° F. for the application of a chlorinated polyether powder which melts at 350° F.

Prior to applying the plastic powder onto the treated surface of the metal, the plastic powder is mixed with a metal powder, e.g. metals such as aluminum, silver, copper, nickel, iron, chromium, antimony, tin, molybdenum, etc. The metal powder is advantageously added in an amount of about one part metal powder to nine parts plastic powder by volume, or five parts metal powder to five parts plastic powder by volume. The powder may be mixed in any conventional blending or mixing apparatus. Having mixed the powders, the mixture is applied to the heated treated metal surface by well-known techniques such as spraying, dusting, or dipping in a fluidized bed of the mixture. In order to maintain the mixture initially substantially uniform throughout the mass thereof it is advantageous to provide the metal powder, which is heavier, in a smaller particle size than the plastic powder. For example, the metal particles remain substantially uniformly distributed throughout the plastic mass even under fluidized bed conditions with metal powder particles having an average particle size of one micron in diameter compared with plastic particles having an average size of about one hundred microns in diameter. On contact with the treated heated surface of the metal, the plastic particles fuse into a viscous mass or layer thereon wherein the metal particles tend to settle toward the treated metal surface with a substantial amount of the metal paricles adjacent the treated metal surface.

The applied layer is subsequently permitted to cool as a coating on the metal with the coating being tenaciously bonded to the metal. Preferably, the mixture may be dusted onto the heated treated metal in an amount to provide a substantially thin fused prime coating and permitted to cool. Thereafter, the composite is reheated above the melting point of a plastic to be subsequently applied thereto, e.g. to about 450° F. so that at least an additional layer of plastic material is fused onto the primed surface to provide a protective plastic coating of greater thickness. The additional layer may be applied by inserting the reheated primed composite into an aerated or fluidized bed of plastic particles, or a sheet of plastic material may be pressed onto the heated primed surface.

Example 1

A strip of steel 3″ long, one inch wide and $3/16″$ thick was first degreased with the organic solvent of trichloroethylene by dipping the strip into the solvent and subsequently drying in air. The strip was then cleaned by placing it into an alkaline solution composed of water containing dissolved therein one pound per gallon of sodium hydroxide and three pounds per gallon of trisodium phosphate and thereafter the strip was rinsed.

Aluminum powder was mixed with plastic powder, i.e. chlorinated polyether with the metal powder and plastic powder being present in a 1:1 ratio.

The degreased and cleaned metal strip was heated to a temperature above the melting point of the plastic powder, i.e. temperature of 450° F. The mixture of metal and plastic powder was applied to the heated metal surface whereon it was fused as a layer and subsequently cooled. Subsequently, a knife-edge was pryed between the plastic layer and the metal layer and the plastic was easily separated from the metal layer indicating that there was very little bond strength between the plastic and the metal.

Example 2

A metal strip identical with that of Example 1 was degreased and cleaned as in Example 1.

A one-half gram amount of chromic anhydride ($CrO_3$) was added to 100 cc. of water to provide a 0.5% solution of chromic acid. The metal strip was immersed into the chromic acid solution and removed therefrom with a thin film of chromic acid solution remaining on the metal. The metal strip was then heated to a temperature of 400° F., and plastic powder was applied to the heated metal by immersing the heated metal into a fluidized bed of chlorinated polyether wherein the powder fused onto the metal as a fused plastic coating. After the coated metal strip was cooled, a knife-edge was inserted between the plastic layer and the metal, and it was found that the plastic easily separated from the metal indicating that there was a poor bond between the plastic and the metal.

Example 3

A metal strip in accordance with Example 2 was prepared and treated with the chromic acid solution as indicated in the example. Thereafter, the treated metal was heated to a temperature of 400° F., and the metal powder-plastic powder mixture of Example 1 was sprinkled onto the heated treated surface wherein the plastic fused onto the treated surface in a layer containing embedded therein the metal powder. The strip was then permitted to cool and the knife test was applied in an attempt to remove the plastic layer from the metal. All attempts of prying the plastic layer from the metal failed, which indicated an extremely good bond between the plastic and the metal. The same plastic coated strip was then immersed in boiling distilled water for 1000 hrs. Thereafter, the sample was alternately transferred from the boiling water to a refrigerated salt-ice mixture at 6° F. for two hrs., whereafter the coated strip was again immersed in the boiling water for an additional two hours. After thirty such cycles the knife test was made and the plastic still could not be removed from the metal which definitely indicated a strong bond between the plastic and the metal.

Example 4

A metal strip identical with that of Example 3 was treated with chromic acid and a mixture of metal powder and plastic powder as indicated in Example 3. After the powder plastic mixture was fused onto the metal in a thin primer film and cooled, it was again reheated 400° F. and immersed into a fluidized bed of chlorinated polyether wherein an additional layer of plastic 0.040" in thickness was fused onto the previously fused primer layer. After fusing the additional layer onto the metal, the composite was cooled and the same tests applied as in Example 3. The bond strength was comparable with that of Example 3.

It is apparent from the above examples, that neither the chromic acid treatment alone nor the metal powder-plastic powder treatment alone provided satisfactory bonding of the plastic to the metal. On the other hand, it is apparent that the combination of the chromic acid treatment followed by the metal-plastic mixture provided an extremely tenacious bond. In addition to the above examples, further experiments were conducted with the employment of 1.0%, 3.0%, 5.0%, 10.0% and 15.0% chromic acid solutions for treating the cleaned metal strips. In each case, a prime coating of 50% by volume aluminum powder and 50% by volume chlorinated polyether was applied to the acid-treated surfaces at 450° F. It was discovered that with up to 3% chromic acid, the bonds were excellent and were good up to about 5% chromic acid, whereafter the bond strength decreased with greater amounts of chromic acid.

While the heretofore disclosed method illustrates particular steps for the provision of the coating, some variations in the sequence of the steps are possible in accordance with the invention so long as the combination of chromic acid treatment, and the provision of the metal powder together with the plastic is maintained. The following examples illustrate some variations of the method according to the above examples:

Example 5

A metal strip identical to that of Example 1 was degreased and cleaned in accordance with Example 1. The cleaned metal was treated with a 0.5% of chromic acid, and the strip was heated to 400° F. A quantity of chlorinated polyether was dissolved in a 3% solution of a solvent cyclohexanone, and the plastic solution was applied to the heated strip whereupon an extremely thin film of the fused plastic rematined after drying. While the thin plastic layer was still in a tacky condition, a thin coat of aluminum powder was sprinkled thereon. The metal strip was then further heated to 450° F. and immersed into an aerated bed of chlorinated polyether powder whereupon the plastic powder fused into a thicker layer onto the heated metal strip. The coated metal strip was then removed and cooled.

Example 6

The metal strip identical to that of Example 1 was degreased and cleaned according to Example 1. A quantity of aluminum powder was treated with a 1% chromic acid solution for five minutes. The powder was then dried and applied to the clean surface of the metal strip after the metal strip was heated to a temperature of 450° F. Thereafter, a quantity of powdered chlorinated polyether was sprinkled onto the metal powdered surface and permitted to fuse into a fused layer covering the treated surface. The coated strip was then permitted to cool.

Example 7

A metal strip was degreased and cleaned in accordance with Example 1. A quantity, 100 gm., of chlorinated polyether powder was then treated with 10 cc. of a 10% chromic acid solution and dried. Then 100 gm. of aluminum powder was mixed with the polyether powder and strip was heated to a temperature of 450° F., and the treated plastic metal powder mixture was sprayed onto the heated surface of the metal thereby forming a fused layer of plastic on the metal. The plastic coated strip was then permitted to cool.

Having prepared coated strips in accordance with Examples 5 through 7, the coated strips were each immersed in boiling water for 1000 hrs. after which they were each tested with the knife test as in Examples 1 through 4, and it was found that the samples exhibited an extremely tenacious bond between the plastic and the metal.

While the above examples are specific to the use of aluminum powder and chromic acid, it is possible to employ powders and metals other than aluminum, such powders being hereinbefore mentioned. Also, it has been determined that molybdic anhydride ($Mo_2O_3$) or vanadic anhydride ($V_2O_5$) may be used in substitution for the chromic anhydride to provide equivalent solutions of molybdic and vanadic acids.

Various modifications of the invention are contemplated within the scope of the appended claims.

What is claimed is:

1. A method of bonding a resin coating on a metal base selected from the group consisting of aluminum, iron and steel, comprising cleaning a surface of the base, treating the cleaned surface with from about 0.1% to about 5.0% aqueous solution of an oxidizing agent selected from the group consisting of chromic acid, molybdic acid and vanadic acid, heating the treated surface and contacting the heated treated surface with a mixture of heat fusible resin powder and an oxidizable metal powder, the metal powder being present in the mixture in a metal to resin ratio of from about 1:9 to 1:1 by volume, the treated base being heated to a temperature above the fusion temperature of the resin powder, and permitting the base to cool.

2. A method of bonding a resin coating on a metal base according to claim 1 comprising re-heating the coated base and applying additional heat fusible resin powder thereto, the coated base being re-heated to a temperature above the fusion temperature of the additionally applied resin powder, and permitting the coated base to cool.

3. A method of bonding a resin coating on a metal base selected from the group consisting of aluminum, iron and steel, comprising cleaning a surface of the base, treating the cleaned surface with from about 0.1% to about 5.0% aqueous solution of an oxidizing agent selected from the group consisting of chromic acid, molybdic acid and vanadic acid, heating the treated base and applying thereto a dilute solution of a heat fusible resin dissolved in a solvent, permitting the applied resin solution to dry to a thin tacky film on the heated treated base, applying a thin coating of an oxidizable metal powder to the tacky film, further heating the metal base and applying a heat fusible resin powder to the metal coated film, the said further heated base being heated to a temperature above the fusion temperature of the applied resin powder, and permitting the base to cool.

References Cited

UNITED STATES PATENTS

| | | | |
|---|---|---|---|
| 1,380,847 | 6/1921 | Sorensen | 117—160 |
| 2,562,118 | 7/1951 | Osdal | 148—6.16 |
| 2,562,119 | 7/1951 | Haon | 148—6.16 |
| 2,656,322 | 10/1953 | Eberle | 148—6.14 |
| 3,085,034 | 4/1963 | Croessant et al. | 117—21 |
| 3,183,113 | 5/1965 | Gemmer | 117—22 XR |
| 3,185,596 | 5/1965 | Schiffman | 148—62 XR |
| 3,215,556 | 11/1965 | Kehr | 117—21 XR |

FOREIGN PATENTS

| | | |
|---|---|---|
| 243,150 | 12/1962 | Australia. |
| 871,422 | 6/1961 | Great Britain. |

WILLIAM D. MARTIN, *Primary Examiner.*

P. F. ATTAGUILE, *Assistant Examiner.*